3,350,462
PREPARATION OF NONIONIC SURFACE ACTIVE AGENTS OF HIGH WETTING POWER
Robert E. Leary, Finderne, Louis J. Nehmsmann III, Metuchen, and Leslie M. Schenck, Mountainside, N.J., assignors to General Aniline & Film Corporation, New York, N.Y., a corporation of Delaware
No Drawing. Filed Nov. 24, 1964, Ser. No. 413,616
8 Claims. (Cl. 260—615)

This invention relates to the manufacture of nonionic detergents having high wetting power from secondary alcohols by a two-stage process which does not require recovery by vacuum distillation of unreacted alcohol.

It is known that superior nonionic surface active agents of extremely high wetting power can be prepared by ethoxylation of secondary alcohols of from 10 to 17 carbon atoms by a two-stage procedure as described in the Carter U.S. Patent 2,870,220. In the first stage, a pure or substantially pure secondary alcohol having 10 to 17 carbon atoms is reacted with ethylene oxide at a temperature of from 0° C. to 80° C. in the presence of an acidic catalyst until between 0.2 mole and 4 moles of ethylene oxide have reacted per mole of the alcohol. The reaction is then neutralized with a 10% methanolic caustic soda solution, fractionally distilled under vacuum and the unreacted alcohol separately recovered. The distillation residue, which is a mixture of monoalkyl ethers of ethylene glycol and the lower polyethylene glycols, is reacted in the second stage with ethylene oxide in the presence of an alkali metal alcoholate of a monoalkyl ether of at least one polyethylene glycol until a total between 4 and 20 moles of ethylene oxide have reacted per mole of the alcohol reacted in the first stage.

The disadvantage of the foregoing two-stage process is that prior to the second stage the neutralized reaction mixture of the first stage must be fractionally distilled under vacuum to separately recover the unreacted secondary alcohol. Fractional distillaton under vacuum in any chemical process is costly and adds to the sales price of the desired product, in this case the nonionic surface active agents. In other words, the overall cost of preparing the nonionic surface active agent by the foregoing two-stage process is quite high.

We have discovered that the two-stage procedure disclosed in the said Carter patent, the entire teachings of which are incorporated herein by reference thereto, can be modified to arrive at essentially the same final nonionic surface active agent having extremely high wetting power by reacting at least one secondary alcohol of from 6 to 20 carbon atoms with propylene oxide instead of ethylene oxide in the presence of an acidic catalyst. By this first stage reaction a much larger proportion of propylene oxide unites with the initial secondary alcohol(s), instead of the monoalkyl-propylene glycol ethers subsequently formed, than is the case in an alkali catalyzed reaction using either ethylene oxide or propylene oxide, or than is the case in the acid catalyzed ethylene oxide addition of the first stage disclosed in the said Carter patent. The resultant reaction mixture of the first stage is then neutralized and the neutralized mixture of monoalkyl ethers of the mono- and poly-propylene glycols is reacted with ethylene oxide in the presence of any conventional alkaline catalyst, such as sodium hydroxide or an alkali metal alcoholate of a mono-alkyl ether of at least 1 poly-propylene glycol, until a total of between 1 and 150 moles of ethylene oxide have reacted per mole of the secondary alcohol(s) reacted in the first stage. By this procedure it is unnecessary to separately recover the unreacted secondary alcohol of the first stage by fractional distillation under vacuum. By elimination of the fractional distillation, a substantial cost reduction of the overall economics of the detergent manufacture is effected.

In the practice of our modified procedure of Carter's two-stage process, we slowly add propylene oxide over several hours to an agitated secondary alcohol of from 6 to 20 carbon atoms or a mixture thereof having from 0.02 to 1.0% by weight of an acidic catalyst therein, within an autoclave-type reactor, while maintaining the reaction mixture at 0–125° C., preferably around 75° C. and a pressure from about atmospheric to 50 p.s.i.g. The acidic catalyst may be any one of the well-known class of the Friedel-Crafts type reaction catalyst, such as the fluorides and chlorides of boron, aluminum, iron, tin, and titanium, and complexes of such halides with amines or ethyl ether. In addition, sulfuric acid or phosphoric acid may also be used.

The propoxylation is continued until a molar ratio of propylene oxide to secondary alcohol(s) of 1:1 to 4:1, and preferably about 2:1, has reacted with the secondary alcohol(s). The reaction mixture is then neutralized, with either powdered caustic or with 50% methanolic caustic soda solution, and a slight excess of an alkaline re-agent such as caustic soda or methanolic caustic in an amount ranging from about 0.01–0.1% by weight of the total charge added as catalyst for the second stage. Ethylene oxide is then added in the usual manner at a temperature varying from 80–200° C., and preferably about 150° C., and at gauge pressures varying from atmospheric to about 50 p.s.i.g. until the desired cloudpoint range, or a desired ratio of ethylene oxide to the propoxylated secondary alcohol(s) is attained. Normally this weight of ethylene oxide will be that required to impart a cloudpoint of from between 0° C. to 100° C. to a 1% aqueous solution of the final product is distilled water. However, for the purpose of our invention, this mole ratio of ethylene oxide to the propoxylated secondary alcohol(s) may vary from 1 to 150.

As examples of the secondary alcohols of from 6 to 20 carbon atoms that may be used in our process, the following are illustrative:

2-heptanol
2-hexanol
2-octanol
2-nonanol
2-decanol
2-dodecanol
2-octadecanol
2-methyl-7-ethyl-4-nonanol
2,7-dimethyl-4-decanol
2-butyl octanol
2,6,8-trimethyl-4-nonanol
3,3-dineopentyl-1-propanol
tridecanol-1
3-ethyl-6-undecanol
2-methyl-7-ethyl-4-undecanol
3,9-diethyl-6-undecanol
2-eicosanol Instead of employing the individual secondary alcohols we can employ a mixture of the secondary alcohols having from 6 to 20 carbon atoms obtained by the sulfation of α-olefins of from 6 to 20 carbon atoms with sulfuric acid followed by hydrolysis in accordance with the procedure of W. J. Hickinbottom, "Reactions of Organic Compounds," Longman, Green & Company, London 1948, page 14, or by the normal addition of hydrobromic acid in the dark with anti-oxidants to yield the 2-bromides in accordance with the procedure of Kharasch and Potts, Org. Chem. 2,195 (1937) followed by hydrolysis.

Alpha-olefins in the carbon range of from $C_6-C_7$; $C_7-C_9$; $C_9-C_{11}$; $C_{11}-C_{15}$; and $C_{15}-C_{20}$ are commercially available and contain from 81 to 86 weight percent of straight chain α-olefins, from <0.5 to 2 weight percent of straight chain internal olefins, from 13 to 3 weight percent of branched and naphthenic olefins, from 2 to 4 weight percent of paraffins and naphthenes and from 1 to <1 of aromatics, respectively. These α-olefin compositions or blends of the entire range are ideally suited for the conversion into a mixture of secondary alcohols by sulfation and hydrolysis or conversion into 2-bromides followed by hydrolysis and the crude alcohol mixture distilled and employed directly in the propoxylation of the first stage. We can also employ secondary alcohols prepared by the conventional oxidation of linear paraffins.

Typical of the oxidation route is British Patent 939,534 of Oct. 16, 1963 granted to Imperial Chemical Industries, Ltd. In this disclosure there is described a process for the oxidation of nonaromatic hydrocarbons to compounds containing oxygen, including alcohols, which comprises reacting a nonaromatic hydrocarbon with free oxygen or a gas containing free oxygen in the presence of a borate ester, the corresponding alcohol of which is more volatile under the reaction conditions than is the alcohol produced in the oxidation reaction. A comprehensive report discussing this important synthesis may be found in a paper entitled, "Synthesis of Higher Aliphatic Alcohols by Direct Oxidation of Paraffinic Hydrocarbons" by A. N. Bashkirov and V. V. Kamzolkin, and presented at the 5th World Petroleum Congress held in New York City during 1959. An earlier disclosure of this art is treated in U.S. 1,947,989, "A Method of Oxidizing Hydrocarbons."

The chlorination of paraffin hydrocarbons is discussed in length by Asinger, Geiseler and Schmiedel, Chemische Berichte 92,3085–3101 (1959). Hydrolysis of these hydrocarbon halides to the corresponding alcohols is disclosed in U.S. 2,572,251 assigned to Shell Development Company. A further discussion of this route is given by F. Asinger, Chemie und Technologie der Paraffin—Kohlenwasser-stoffe, published by Akademie—Verlag, Berlin, 1959. Addition of HBr to olefins followed by hydrolysis to the corresponding secondary alcohol is discussed by Kharasch and Potts, Org. Chem. 2,195 (1937).

The hydrocarbon feed stock which we can employ contains from 10% to 90% of a secondary alcohol or mixtures of secondary alcohols having from 6 to 20 carbon atoms obtained by the foregoing procedures.

The unique advantages of our invention will be apparent from the following illustrative examples:

*Example I*

Into a one-liter, four-neck flask equipped with an agitator, thermometer, addition funnel and condenser are charged 186 grams (1 mole) of 2,6,8-trimethyl-4-nonanol and 0.55 gram (0.03 mole) of boron trifluoride. The system is purged with nitrogen. Propylene oxide, 116 grams (2 moles), is added over one hour at 75–80° C. with constant agitation. The acid catalyst is neutralized to pH=8.5 with methanolic caustic. Caustic soda (0.3 gram) is added to the neutralized product which is reacted in an autoclave at 150–160° C. at 0–15 lbs. pressure with 369 grams (8.4 moles) of ethylene oxide to a cloudpoint (1% in water) of 36° C. The surfactant properties of the product are indicated by the Draves Wetting of 0.53 g./l. for 25 seconds. Draves Wetting is a standard test of surfactants which measures the concentration in water of the surfactant required to wet a standard 5 grams cotton skein in 25 seconds at 25° C.

*Example II*

2,6,8-trimethyl-4-nonanol was ethoxylated to a cloudpoint of 36° C. according to the teaching of Example 1 of U.S. 2,870,220. This product designated Tergitol TMN, as commercially available, has a Draves Wetting of 0.5 g./l. for 25.4 seconds.

*Example III*

In a one-stage reaction, 2,6,8-trimethyl-4-nonanol, 186 grams (1 mole), is charged to an autoclave with (0.5 g.) caustic and is reacted at 150–160° C. with 374 grams (8.5 mole) of ethylene oxide to a cloudpoint of 36° C. (1% in $H_2O$). This product is inferior in wetting efficiency (Draves Wetting=0.7 g./l. in 25 seconds) to the surfactant obtained by our process as described in Example I.

*Example IV*

Proceeding as in Example I, 186 grams (1 mole) of 2-dodecanol and 0.55 gram (0.03 mole) of boron trifluoride are reacted with 116 grams (2 moles) of propylene oxide at 75–80°. The propoxylate is neutralized, made alkaline and ethoxylated with 10.7 moles of ethylene oxide to a cloudpoint of 61° C.

This product has a wetting efficiency of 0.47 g./l. for 25.0 seconds by the Draves method.

*Example V*

According to Example I, 102 grams (1 mole) of hexanol-2 and 0.55 gram (0.03 mole) of boron trifluoride were reacted with 116 grams propylene oxide (2 moles). The acid catalyst was neutralized with methanolic caustic and caustic soda. The propoxylate was then ethoxylated (6.0 moles of ethylene oxide) to a cloudpoint of 55°. This material had a Draves method wetting efficiency of 0.6 gram per liter for 25 seconds.

*Example VI*

As in Example I, 207 grams (1 mole) of a mixture of substantially pure $C_{12-15}$ secondary alcohols were propoxylated with 116 grams (2 moles) of propylene oxide. Neutralization and ethoxylation were carried out according to the said example utilizing 21 moles of ethylene oxide. The product had a cloudpoint of 54° C. and a Draves method wetting efficiency of 1.4 grams per liter.

*Example VII*

One mole, 298 grams, of eicosanol alcohol, were propoxylated by 116 grams (2 moles) of propylene oxide as in Example I. The neutralized propoxylate was ethoxylated with 25 moles of ethylene oxide. The product had a cloudpoint of 52° C. and a wetting efficiency of 1.6 grams per liter by the Draves method.

We claim:

1. The process which comprises in a first stage passing propylene oxide into at least one secondary alkanol of from 6 to 20 carbon atoms at a temperature of from 0° to 125° C. in the presence of an acidic catalyst selected from the class consisting of Friedel-Crafts type catalyst, sulfuric acid and phosphoric acid until between one mole to four moles of propylene oxide have reacted per mole of said alkanol, neutralizing the resultant propoxylated reaction mixture, and in a second stage reacting the neutralized mixture of propoxylated alkyl ethers of mono- and poly-propylene glycols with ethylene oxide in the presence of an alkaline catalyst selected from the class consisting of sodium hydroxide and an alkali metal alcoholate of a mono-alkyl ether of at least 1 poly-propylene glycol at a temperature of from about 50° C. to 200° C. until between 1 and 150 moles of ethylene oxide have reacted per mole of said propoxylated reaction mixture from the first stage.

2. The process which comprises in a first stage passing propylene oxide into an aliphatic hydrocarbon mixture containing from 10% to 90% by weight of at least one secondary alkanol of from 6 to 20 carbon atoms at a temperature of from 0° to 125° C. in the presence of an acidic catalyst selected from the class consisting of Friedel-Crafts type catalyst, sulfuric acid and phosphoric acid until between one mole to four moles of propylene oxide have reacted per mole of said alkanol, neutralizing the resultant propoxylated reaction mixture, and in a second stage reacting the neutralized mixture of propoxylated alkyl ethers of mono- and poly-propylene glycols with ethylene oxide in the presence of an alkaline catalyst selected from the class consisting of sodium hydroxide and an alkali metal alcoholate of a mono-alkyl ether of at least 1 poly-propylene glycol at a temperature of from about 50° C. to 200° C. until between 1 and 150 moles of ethylene oxide have reacted per mole of said propoxylated reaction mixture from the first stage.

3. The process which comprises in a first stage passing propylene oxide into at least one secondary alkanol of from 6 to 20 carbon atoms at a temperature of from 75–80° C. in the presence of an acidic catalyst selected from the class consisting of Friedel-Crafts type catalyst, sulfuric acid and phosphoric acid until between one mole to four moles of propylene oxide have reacted per mole of said alkanol, neutralizing the resultant propoxylated reaction mixture, and in a second stage reacting the neutralized mixture of propoxylated alkyl ethers of mono- and poly-propylene glycols with ethylene oxide in the presence of an alkaline catalyst selected from the class consisting of sodium hydroxide and an alkali metal alcoholate of a mono-alkyl ether of at least 1 poly-propylene glycol at a temperature of 150°–160° C. until between 1 and 150 moles of ethylene oxide have reacted per mole of said propoxylated mixture from the first stage.

4. The process which comprises in a first stage passing propylene oxide into 2,6,8-trimethyl-4-monanol at a temperature of from 75–80° C. in the presence of boron trifluoride until two moles of propylene oxide have reacted per mole of said nonanol, neutralizing the resultant propoxylated reaction mixture, and in a second stage, reacting the neutralized mixture of propoxylated alkyl ethers of mono- and poly-propylene glycols with 8.4 moles of ethylene oxide in the presence of sodium hydroxide at a temperature of 150–160° C.

5. The process which comprises in a first stage passing propylene oxide into 2-dodecanol at a temperature of from 75–80° C. in the presence of boron trifluoride until two moles of propylene oxide have reacted per mole of said dodecanol, neutralizing the resultant propoxylated reaction mixture, and in a second stage reacting the neutralized mixture of propoxylated alkyl ethers of mono- and poly-propylene glycols with 10.7 moles of ethylene oxide in the presence of sodium hydroxide at a temperature of from 150–160° C.

6. The process which comprises in a first stage passing propylene oxide into 2-hexanol at a temperature of from 75–80° C. in the presence of boron trifluoride until two moles of propylene oxide have reacted per mole of said hexanol, neutralizing the resultant propoxylated reaction mixture, and in a second stage reacting the neutralized mixture of propoxylated alkyl ethers of mono- and poly-propylene glycols with six moles of ethylene oxide in the presence of sodium hydroxide at a temperature of 150–160° C.

7. The process which comprises in a first stage passing propylene oxide into 2-eicosanol at a temperature of 75–80° C. in the presence of boron trifluoride until two moles of propylene oxide have reacted per mole of said eicosanol, neutralizing the resultant propoxylated reaction mixture, and in a second stage reacting the neutralized mixture of propoxylated alkyl ethers of mono and poly-propylene glycols with 25 moles of ethylene oxide in the presence of sodium hydroxide at a temperature of 150–160° C.

8. The process which comprises in a first stage passing two moles of propylene oxide into one mole of a mixture of $C_{12-15}$ secondary alkanols at a temperature of from 75–80° C. in the presence of boron trifluoride, neutralizing the resultant propoxylated reaction mixture, and in a second stage reacting the neutralized mixture of propoxylated alkyl ethers of mono- and poly-propylene glycols with 21 moles of ethylene oxide in the presence of sodium hydroxide at a temperature of from 150–160° C.

References Cited
UNITED STATES PATENTS

| | | | |
|---|---|---|---|
| 2,355,823 | 8/1944 | Schlegel | 260—615 |
| 2,870,220 | 1/1959 | Carter | 260—615 |
| 3,030,426 | 4/1962 | Moseley et al. | 260—615 |

FOREIGN PATENTS

| | | |
|---|---|---|
| 540,359 | 4/1957 | Canada. |

LEON ZITVER, *Primary Examiner.*

H. T. MARS, *Assistant Examiner.*